US010967959B2

(12) United States Patent
Allwein et al.

(10) Patent No.: US 10,967,959 B2
(45) Date of Patent: Apr. 6, 2021

(54) FOLDING TRAILING ARM LANDING GEAR

(71) Applicant: General Atomics Aeronautical Systems, Inc., San Diego, CA (US)

(72) Inventors: Michael Joseph Allwein, San Luis Obispo, CA (US); Caleb Andrew Bartels, Escondido, CA (US); Brian Michel Shamblin, Ramona, CA (US); James Edward McMillen, Ramona, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 470 days.

(21) Appl. No.: 15/703,416

(22) Filed: Sep. 13, 2017

(65) Prior Publication Data

US 2019/0077499 A1  Mar. 14, 2019

(51) Int. Cl.
*B64C 25/26* (2006.01)
*B64C 25/10* (2006.01)
*B64C 25/20* (2006.01)
*B64C 25/12* (2006.01)
*B64C 25/14* (2006.01)
*B64C 25/18* (2006.01)

(52) U.S. Cl.
CPC .............. *B64C 25/10* (2013.01); *B64C 25/12* (2013.01); *B64C 25/14* (2013.01); *B64C 25/18* (2013.01); *B64C 25/20* (2013.01); *B64C 25/26* (2013.01)

(58) Field of Classification Search
CPC ......... B64C 25/10; B64C 25/20; B64C 25/26; B64C 25/24
See application file for complete search history.

(56) References Cited

U.S. PATENT DOCUMENTS

| 2,220,546 | A | * | 11/1940 | Saulnier | ................. B64C 25/14 244/102 R |
| 2,399,846 | A | * | 5/1946 | Bachman | ................ B64C 25/10 244/104 R |
| 2,497,415 | A | | 2/1950 | Parker | |
| 2,511,528 | A | | 6/1950 | Clark | |
| 2,661,171 | A | | 12/1953 | Allen | |

(Continued)

FOREIGN PATENT DOCUMENTS

| CN | 104354853 | | 2/2015 | |
| EP | 0676328 | A2 * | 10/1995 | ............. B64C 25/34 |

(Continued)

OTHER PUBLICATIONS

International Preliminary Report on Patentability issued in PCT/US2018/044116 mailed by the International Bureau dated Mar. 26, 2020.

(Continued)

*Primary Examiner* — Jessica B Wong
(74) *Attorney, Agent, or Firm* — Fitch, Even, Tabin & Flannery LLP

(57) ABSTRACT

A folding trailing arm landing gear assembly having a main fitting configured to couple to a hinge positioned at a proximal end; a swing arm rotatably coupled at a proximal end to a distal end of the main fitting; a shock coupled at a distal end to a distal end of the swing arm; a bellcrank coupled at a distal end to a proximal end of the shock, and coupled at a proximal end to the main fitting; and a wheel coupled to the swing arm.

7 Claims, 14 Drawing Sheets

(56) References Cited

U.S. PATENT DOCUMENTS

| | | | |
|---|---|---|---|
| 3,870,254 | A | 3/1975 | Watts |
| 4,328,939 | A | 5/1982 | Davies |
| 5,100,083 | A | 3/1992 | Large |
| 8,061,653 | B2 | 11/2011 | Chow |
| 8,123,161 | B1 | 2/2012 | Collins |
| 2013/0020436 | A1 | 1/2013 | Ducos |
| 2015/0041587 | A1 | 2/2015 | Schmidt |
| 2015/0069178 | A1 | 3/2015 | Brown |
| 2016/0023750 | A1* | 1/2016 | Thompson .............. B64C 25/18 244/102 A |
| 2018/0037314 | A1* | 2/2018 | Wilson .................... B64C 25/12 |

FOREIGN PATENT DOCUMENTS

| | | | | | |
|---|---|---|---|---|---|
| FR | 1246932 | A | * | 11/1960 | ............. B64C 25/10 |
| GB | 592591 | | | 9/1947 | |
| GB | 644147 | | | 10/1950 | |
| GB | 914582 | | | 1/1963 | |
| GB | 931916 | A | * | 7/1963 | ............. B64C 25/14 |
| GB | 984775 | A | * | 3/1965 | ............. B64C 25/14 |
| GB | 1216732 | A | * | 12/1970 | ............. B64C 25/14 |

OTHER PUBLICATIONS

International Search Report issued in PCT/US2018/044116 mailed by the International Bureau dated Nov. 13, 2018.

Written Opinion of the International Searching Authority issued in PCT/US2018/044116 mailed by the International Bureau dated Nov. 13, 2018.

\* cited by examiner

FOLDING TRAILING ARM LANDING GEAR

BACKGROUND OF THE INVENTION

1. Field of the Invention

The present invention relates generally to a folding trailing arm landing gear assembly.

2. Discussion of the Related Art

Foldable retractable landing gear for aircraft has been one of the significant advancements in aircraft engineering since the dawn of powered aircraft flight. The ability to fold landing gear into the wing of an airplane or into the fuselage of an airplane reduces the drag profile of the airplane in flight, thereby enhancing handling characteristics, speed and efficiency.

One of the challenges, however, the designers face in aircraft with foldable retractable landing gear is the space needed within the aircraft for the landing gear. This is particularly true in those cases where aircraft volume is a principal design characteristic, such as when attempting to reduce aircraft volume so that the aircraft can be efficiently deployed on, for example, an aircraft carrier, where space is at a premium.

Another instance where this challenge comes into play is with smaller aircraft.

As such, improvements in the design of aircraft landing gear that reduce the space needed within the aircraft for the landing gear, or, for example, reduce the length or depth of a well or compartment needed for the stowed landing gear, are desirable.

At the same time, simpler designs are generally preferable to complex designs, and forcing shocks into compression in order to reduce stowed volume can introduce additional challenges.

As such, improvements are needed in the design of foldable retractable landing gear for aircraft.

SUMMARY OF THE INVENTION

Several embodiments of the invention provide a folding trailing arm landing gear assembly.

In one embodiment, the invention can be characterized as a folding trailing arm landing gear assembly comprising a main fitting configured to couple to a hinge positioned at a proximal end; a swing arm rotatably coupled at a proximal end to a distal end of the main fitting; a shock coupled at a distal end to a distal end of the swing arm; a bellcrank coupled at a distal end to a proximal end of the shock, and coupled at a proximal end to the main fitting; and a wheel coupled to the swing arm.

In another embodiment, the invention can be characterized as a folding trailing arm landing gear assembly comprising a main fitting configured to couple to a hinge positioned at a proximal end; a swing arm rotatably coupled at a proximal end to a distal end of the main fitting; a shock coupled at a distal end to a distal end of the swing arm; a bellcrank coupled at a distal end to a proximal end of the shock, and coupled at a proximal end to the main fitting; a wheel coupled to the swing arm; and a drivelink coupled at a distal end to the bellcrank and configured to couple to a wing at a proximal end, the drivelink being configured in an orientation off-parallel from the main fitting, and off-normal from the main fitting.

In a further embodiment, the invention may be characterized as a folding trailing arm landing gear assembly comprising a main fitting configured to couple to a hinge positioned at a proximal end; a swing arm rotatably coupled at a proximal end to a distal end of the main fitting; a shock coupled at a distal end to a distal end of the swing arm; a bellcrank coupled at a distal end to a proximal end of the shock, and coupled at a proximal end to the main fitting; a wheel coupled to the swing arm; a drivelink coupled at a distal end to the bellcrank and configured to couple to a wing at a proximal end, the drivelink being configured in an orientation off-parallel from the main fitting, and off-normal from the main fitting; and a lock solenoid coupled to the main fitting and configured to lock the bellcrank into a deployed position when locked, and configured to release the bellcrank when unlocked.

In yet another embodiment, the invention may be characterized as a method of operating a folding trailing arm landing gear assembly comprising the steps of actuating a lock solenoid to release a lock, wherein the lock secures a bellcrank in a deployed position; actuating a retract servo to pull a main fitting toward a side of the aircraft and rotate the main fitting; pulling a bellcrank away from the main fitting with a drivelink in response to the movement of the main fitting; pulling a shock toward the bellcrank in response to the pulling of the bellcrank; pulling a swing arm toward the bellcrank in response to the pulling of the shock.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
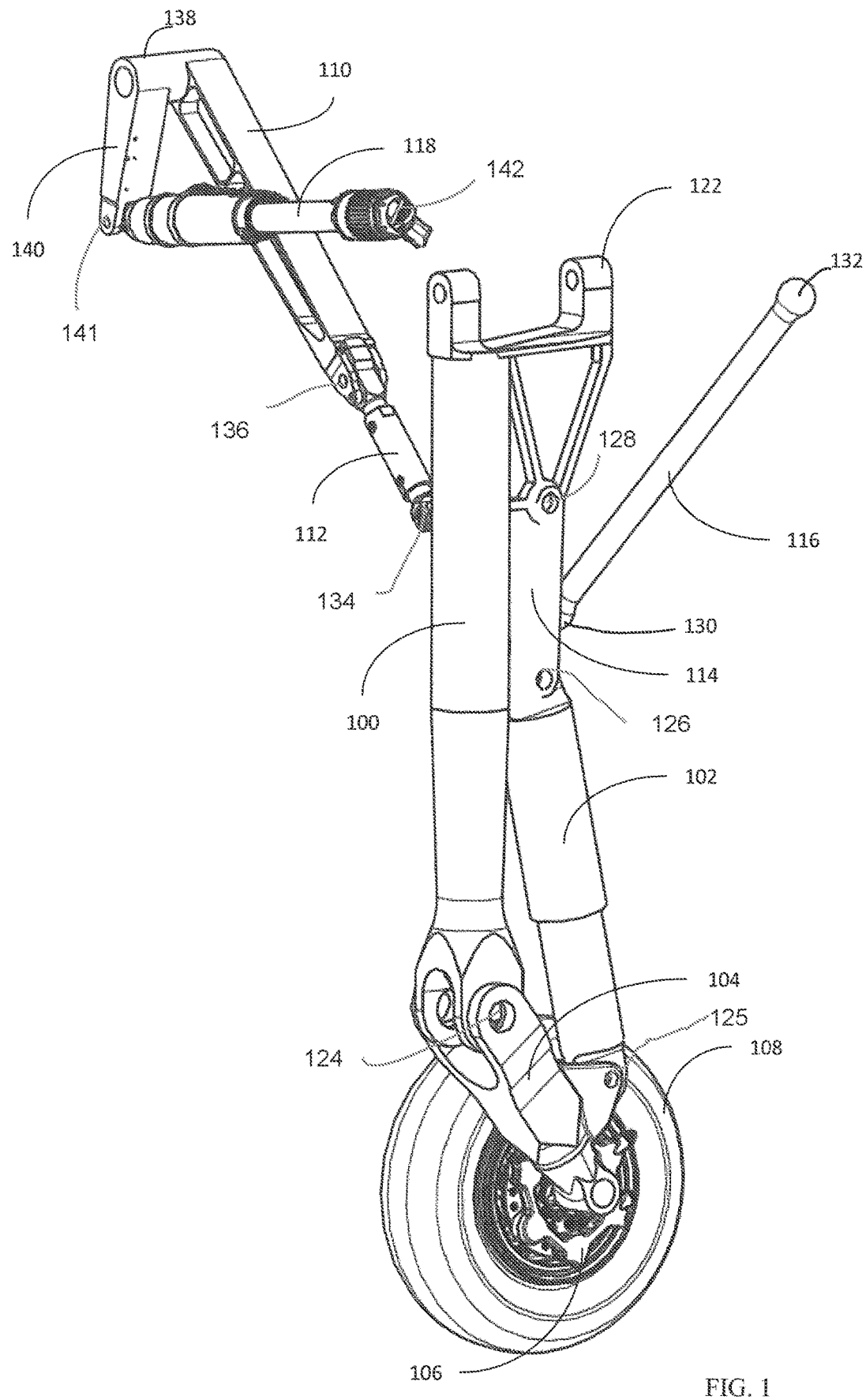
FIG. 1 is a perspective view of a folding trailing arm landing gear assembly in accordance with one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments.

High performance aircraft by nature are volume challenged for packaging landing gear assemblies. Minimizing landing gear retracted volume supports more efficient airframe structure, more efficient fuel volume, and greater provisions for a variety of mission payloads. This challenge is amplified for carrier-based aircraft which experience high landing sink rates, require long landing gear for aircraft carrier operations aircraft clearances, and longs stroke to lower impact loads.

Referring first to FIG. 1, shown is a perspective view of a folding trailing arm landing gear assembly for an aircraft in accordance with one embodiment of the present invention. Shown is a main fitting 100, a shock 102, a swing arm 104, a brake assembly 106, a wheel-tire assembly 108, an upper side brace 110, a lower side brace 112, a bellcrank 114, a drivelink 116, a retract servo 118, and a lock solenoid 150.

The main fitting 100 is pivotally coupled at a proximal end to an aircraft, such as below the wing of the aircraft, at a hinge 122 (half of which is shown, another half of which is affixed to the wing, such as below the wing in a landing gear well or compartment). The hinge 122 is aligned parallel to the longitudinal axis (or roll axis) of the aircraft, thereby permitting rotation of the main fitting 100 on an axis parallel to the longitudinal axis of the aircraft. The main fitting 100 is pivotally coupled at a distal end to a proximal end of the swing arm 104. The swing arm 104 is coupled to the main fitting 100 on a pivot pin 124, thereby permitting rotation of the swing arm 104 on an axis parallel to the lateral axis (or pitch axis) of the aircraft.

The wheel-tire assembly 108, and the brake assembly 106 are coupled to a distal end of the swing arm 104 trailing the main fitting 100 in a conventional manner to allow rotation of the wheel-tire assembly 108 about an axis that is parallel to the lateral axis (or pitch axis) of the aircraft.

The shock 102 is pivotally coupled at a distal end of the shock 102 to the distal end of the swing arm 104 near where the wheel-tire assembly 108 is coupled to the distal end of the swing arm 104 via a pivot pin 125 that permits rotation about an axis parallel to the lateral axis (or pitch axis) of the aircraft, and pivotally coupled at a proximal end of the shock 102 to a distal end of the bellcrank 114 via a pivot pin 126 that permits rotation about an axis parallel to the lateral axis (or pitch axis) of the aircraft. A proximal end of the bellcrank 114 is coupled to proximal end of the main fitting 100 near the hinge 122 via a pivot pin 128 that permits rotation about the lateral axis (pitch axis) of the aircraft.

The bellcrank 114 transfers shock 102 load into main fitting 100 and aids in shrinking gear during retraction as described herein further below.

The drivelink 116 is coupled to the bellcrank 114 at a distal end of the drivelink 116 near the center of the bellcrank 114 via a first spherical bearing 130. (A spherical bearing is a bearing that permits angular rotation about a central point in two orthogonal directions.) And, the drivelink 116 is coupled to the aircraft at a proximal end via a second spherical bearing 132. As depicted, the second spherical bearing 132 is behind the hinge 122, and to the right of the hinge 122 (when viewed from the front of the aircraft), whereby the drivelink 116 exerts an upward force on the bellcrank 114 when the main fitting 100 is rotated at the hinge 122 about the axis parallel to the longitudinal axis (roll axis) in a direction to the left of the hinge 122 (when viewed from the front of the aircraft). The drivelink 116 is a two-force member that drives shrinking of the landing gear assembly during retraction.

Note that these "left" and "right" references are for purposes of explanation, as it is anticipated that in most applications a mirror image landing gear would be employed on an opposite wing of the aircraft. As such, references to "left" and "right" should be reversed in reference to this mirror image landing gear.

The lower side brace 112 is pivotally coupled to the main fitting 100 at a point down from the hinge 122 about one-quarter to one-third of the way to the distal end of the main fitting 100 at a distal end of the lower side brace 112. The lower side brace 112 is oriented normal to the longitudinal axis, and parallel to the lateral axis. The lower side brace 112 is pivotally coupled to the main fitting 100 via a pivot pin 134 that permits rotation about an axis of rotation that is substantially parallel to the axis of rotation of the hinge 122.

The upper side brace 110 (which forms part, i.e., one leg, of a crank mechanism 138) is pivotally coupled at a distal end to the proximal end of the lower side brace 112 via a pivot pin 136 that permits rotation about an axis of rotation that is substantially parallel to the axis of rotation of the hinge 122.

The upper side brace 110 forms one leg of a crank mechanism 138, with its proximal end being fixed to the wing of the aircraft at a pivot pin that permits the upper side brace 110 to rotate about an axis that is substantially parallel to the axis of rotation of the hinge 122, i.e., substantially parallel to the longitudinal axis of the aircraft.

The crank mechanism 138 includes a crank arm 140 pivotally coupled via a pivot pin 141 to a distal end of a retract servo 118. A proximal end of the retract servo 118 is coupled via a pivot pin 142 to the wing, such as in a landing gear well or compartment.

The retract servo 118 contracts from a deployed position, i.e., from a fully expanded state, to pull the crank arm 140, and thereby rotate the crank mechanism 138. When the crank mechanism 138 rotates in this fashion, the upper side brace 110 rotates, and moves the distal end of the upper side brace 110 toward the main fitting 100 causing the lower side brace 112 to pull the main fitting 100 to the side (toward the crank mechanism 138, or to the left, when viewed from the front of the aircraft) and up (toward the wing, e.g., into the landing gear well or compartment).

The above combination provides a landing gear retract mechanism that condenses a retracted gear volume to allow more efficient aircraft integration of landing gear.

The drivelink 116 drives the bellcrank 114 attached to the shock 102 that rotates the main gear swing arm 104 (trailing arm) during retraction and deployment. The mechanism requires no separate actuation (other than to retract a servo (lock solenoid 150)) or high-load compression of the shock 102.

In operation, after the aircraft is airborne, pressure is applied to the brake assembly 106 to bring the wheel-tire assembly 108 to rest. Next, the lock solenoid 150 (or bellcrank 114 solenoid lock 152 (described below)) is commanded to open by energizing the lock solenoid 150. The lock solenoid 150 serves as a fail-safe to prevent movement of the bellcrank 114 while the landing gear is deployed. Next, the retract servo 118 is energized and contracts to retract the landing gear into a well or compartment in the wing. To retract the landing gear, the distal end of the crank arm 140 of the crank mechanism 138 rotates toward the main fitting 100. This rotation causes the distal end of the upper side arm to rotate toward the main fitting 100. In response, the lower side arm pulls the main fitting 100 toward the crank mechanism 138 and wing. As the main fitting 100 rotates toward the crank mechanism 138, the drive link pulls the bellcrank 114 away from the main fitting 100. The bell crank pulls up on the shock 102, which pulls up on the swing arm 104, and wheel-tire assembly 108, moving the wheel-tire assembly 108 toward the hinge 122.

As the retract servo 118 continues to pull the crank arm 140 toward the main fitting 100, the upper side arm finally assumes an orientation roughly parallel to the main fitting 100, and thereby pulls the landing gear into its retracted position, such as in the well, or the compartment.

The present embodiment of the invention utilizes an existing degree of freedom at the pivot pin at the proximal end of the swing arm 104, to optimize the retracted shape of the landing gear. The bellcrank 114 causes the swing arm 104 rotation.

Separating a strut into two components, a traditional strut (the main fitting 100) and a secondary bellcrank 114 (the bellcrank 114) permits movement without shock 102 compression or secondary actuators, which would otherwise lead to lower reliability and greater weight.

The bellcrank 114 is driven by a slaved mechanism fixed to the airframe, i.e., the drivelink 116. Similar slaved mechanisms have not heretofore been used with a bellcrank 114 affixed to the landing gear strut (the main fitting 100), rotating the wheel about the pivot pin 124 at the distal end of the swing arm 104 with no shock 102 compression.

Figure 2:
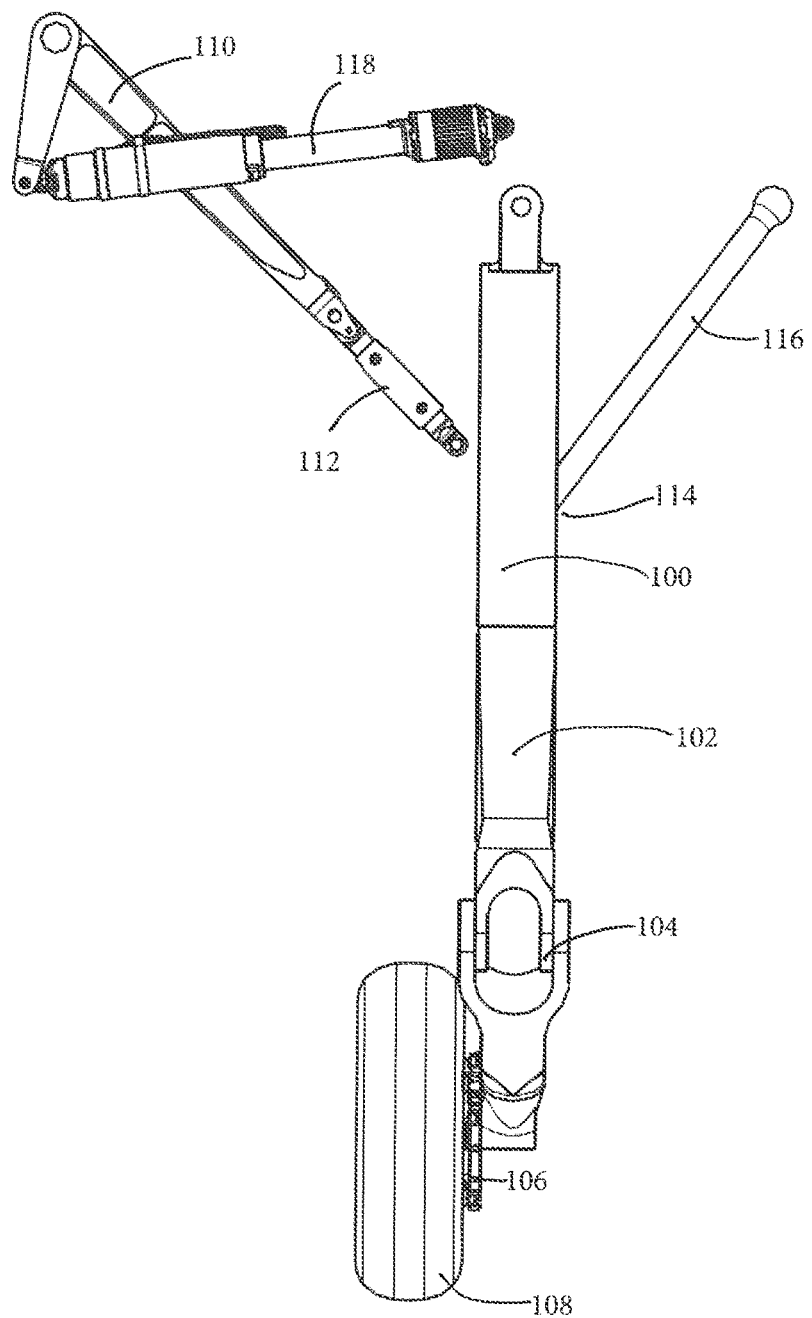
FIG. 2 is a front view of a folding trailing arm landing gear assembly in accordance with the embodiment of the present invention of FIG. 1.

Referring next to FIG. 2, a front view is shown of a folding trailing arm landing gear assembly in accordance with the embodiment of the present invention of FIG. 1.

Shown is the main fitting 100, the shock 102, the swing arm 104, the brake assembly 106, the wheel-tire assembly 108, the upper side brace 110, the lower side brace 112, the bellcrank 114, the drivelink 116, the retract servo 118, and the lock solenoid 150.

Figure 3:
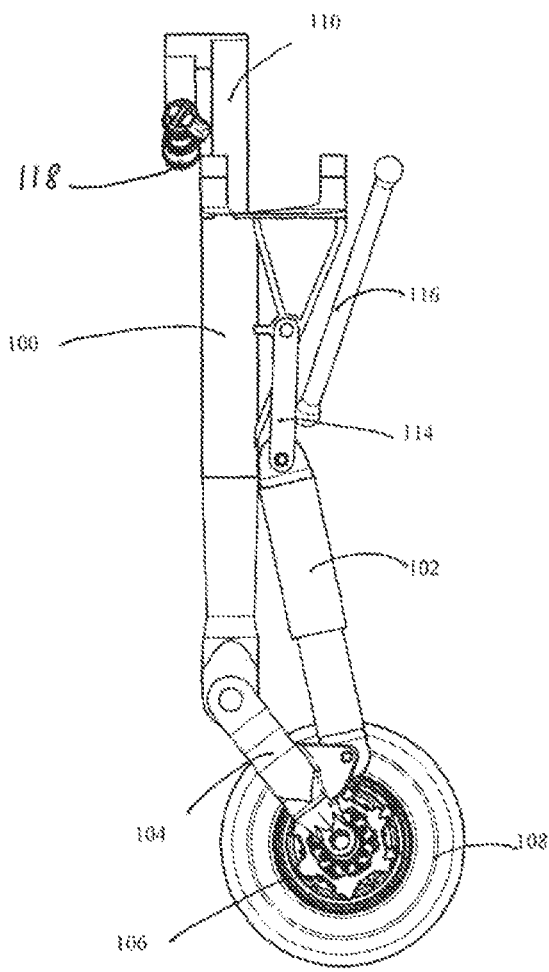
FIG. 3 is a side view of a folding trailing arm landing gear assembly in accordance with the embodiment of the present invention of FIG. 1.

Referring next to FIG. 3, a side view is shown of a folding trailing arm landing gear assembly in accordance with the embodiment of the present invention of FIG. 1.

Shown is the main fitting 100, the shock 102, the swing arm 104, the brake assembly 106, the wheel-tire assembly 108, the upper side brace 110, the lower side brace 112 (obscured from view), the bellcrank 114, the drivelink 116, the retract servo 118, and the lock solenoid 150.

Figure 4:
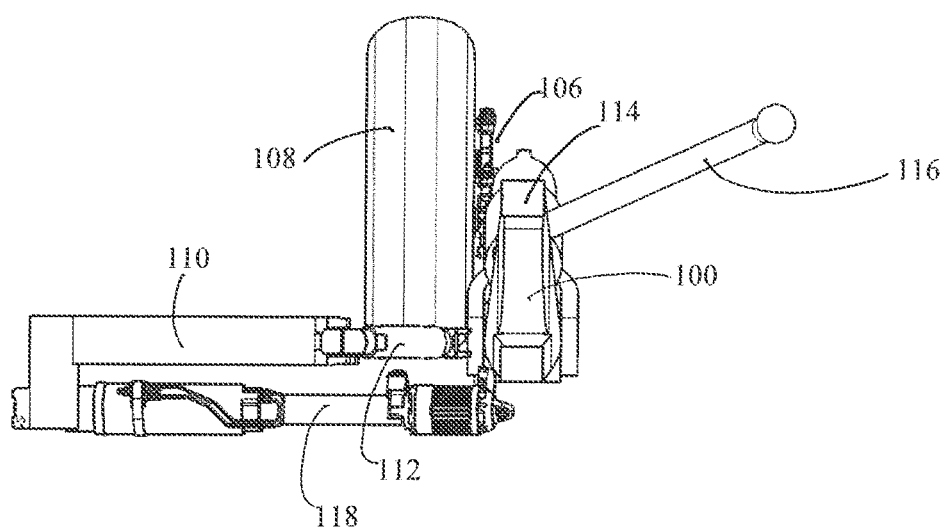
FIG. 4 is a top view of a folding trailing arm landing gear assembly in accordance with the embodiment of the present invention of FIG. 1.

Referring next to FIG. 4, a top view is shown of a folding trailing arm landing gear assembly in accordance with the embodiment of the present invention of FIG. 1.

Shown is the main fitting 100, the shock 102 (obscured from view), the swing arm 104 (obscured from view), the brake assembly 106, the wheel-tire assembly 108, the upper side brace 110, the lower side brace 112, the bellcrank 114, the drivelink 116, the retract servo 118, and the lock solenoid 150.

Figure 5:
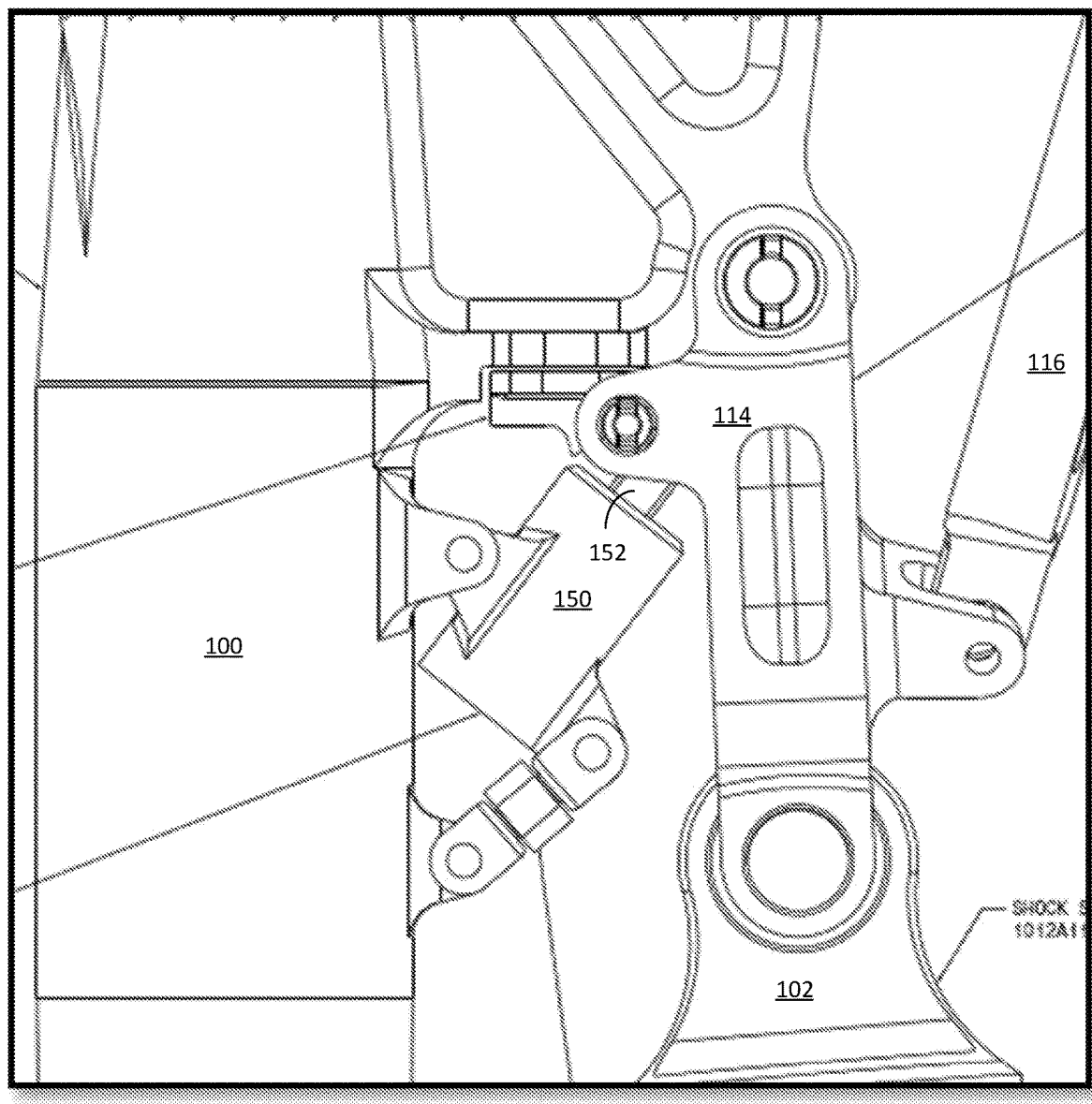
FIG. 5 is a side detailed view of a folding trailing arm landing gear assembly in a locked position in accordance with the embodiment of the present invention of FIG. 1.

FIG. 5 is a detailed partial side view of a folding trailing arm landing gear assembly in a locked position in accordance with the embodiment of the present invention of FIG. 1.

Shown is the main fitting 100, the shock 102, the bellcrank 114, the drivelink 116, and a lock solenoid 150.

The shock 102 is pivotally coupled at a proximal end of the shock 102 to a distal end of the bellcrank 114 via a pivot pin 126 that permits rotation about an axis parallel to the lateral axis or pitch axis) of the aircraft. A proximal end of the bellcrank 114 is coupled to proximal end of the main fitting 100 via a pivot pin that permits rotation about the lateral axis (pitch axis) of the aircraft.

The bellcrank 114 transfers shock 102 load into main fitting 100 and aids in shrinking gear during retraction as described herein further below.

The drivelink 116 is coupled to the bellcrank 114 at a distal end of the drivelink 116 near the center of the bellcrank 114 via a first spherical bearing 130. The drivelink 116 is a two-force member that drives shrinking of the landing gear assembly during retraction.

The drivelink 116 drives the bellcrank 114 attached to the shock 102 that rotates the main gear swing arm 104 (trailing arm) during retraction and deployment. The mechanism requires no separate actuation (other than to retract a servo (lock solenoid 150)) or high-load compression of the shock 102.

Figure 6:
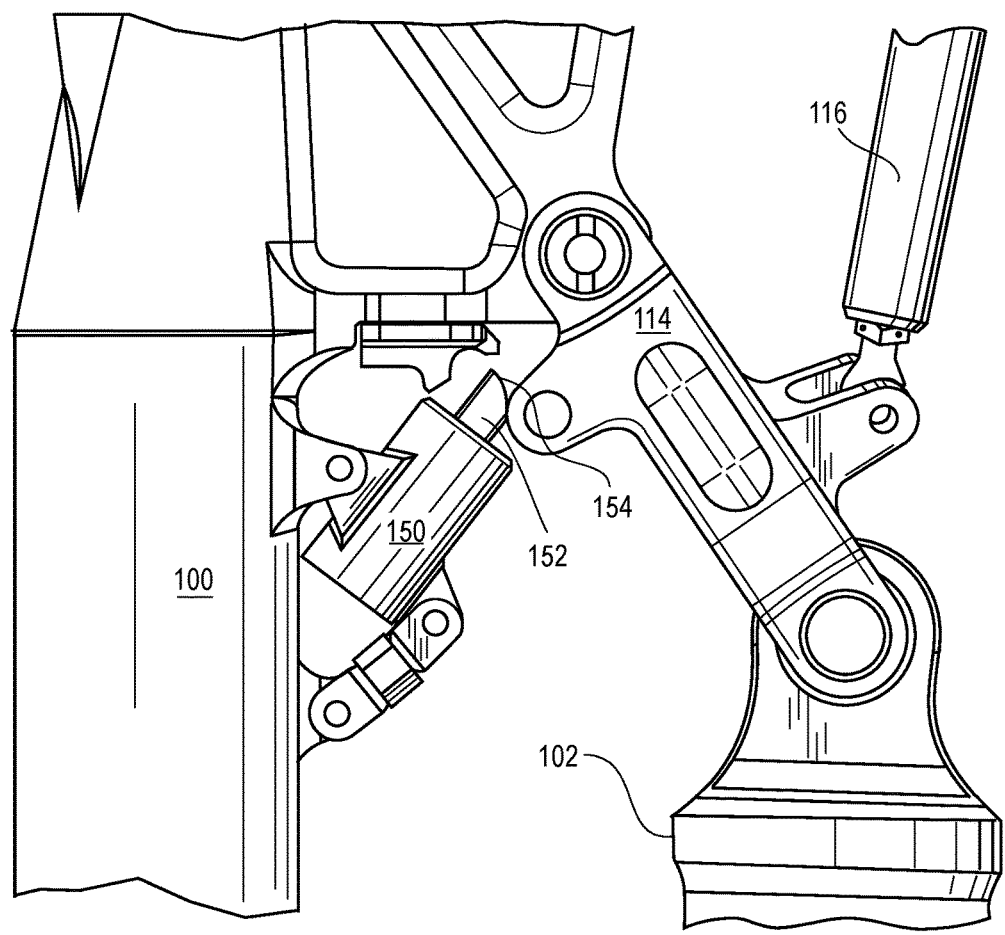
FIG. 6 is a side detailed view of a folding trailing arm landing gear assembly in an unlocked position in accordance with the embodiment of the present invention of FIG. 1.

In operation, the lock solenoid 150 (or bellcrank 114 solenoid lock 152 (shown in the locked position)) is commanded to open (as shown in FIG. 6) by energizing the lock solenoid 150. The lock solenoid 150 serves as a fail-safe to prevent movement of the bellcrank 114 while the landing gear is deployed.

As the main fitting 100 rotates toward the crank mechanism 138, the drive link pulls the bellcrank 114 away from the main fitting 100 (this movement has begun in the illustration of FIG. 6). The bell crank pulls up on the shock 102.

The lock solenoid 150 operates a lock 152 that ensures that the shock 102 and bell crank remain over center when the landing gear is down and locked.

Sudden extension loads are reacted by the lock 152, preventing movement of the bellcrank 114 until the lock 152 is operated by the lock solenoid 150. The lock 152 must be retracted (as shown in FIG. 6) prior to gear retraction.

The lock 152 incorporates a ramp profile 154 on an aft face for passive locking of the bell crank during deployment of the landing gear.

FIG. 6 is a side detailed view of a folding trailing arm landing gear assembly in an unlocked position in accordance with the embodiment of the present invention of FIG. 1.

Shown is the main fitting 100, the shock 102, the bellcrank 114, the drivelink 116, and a lock solenoid 150.

Figure 7:
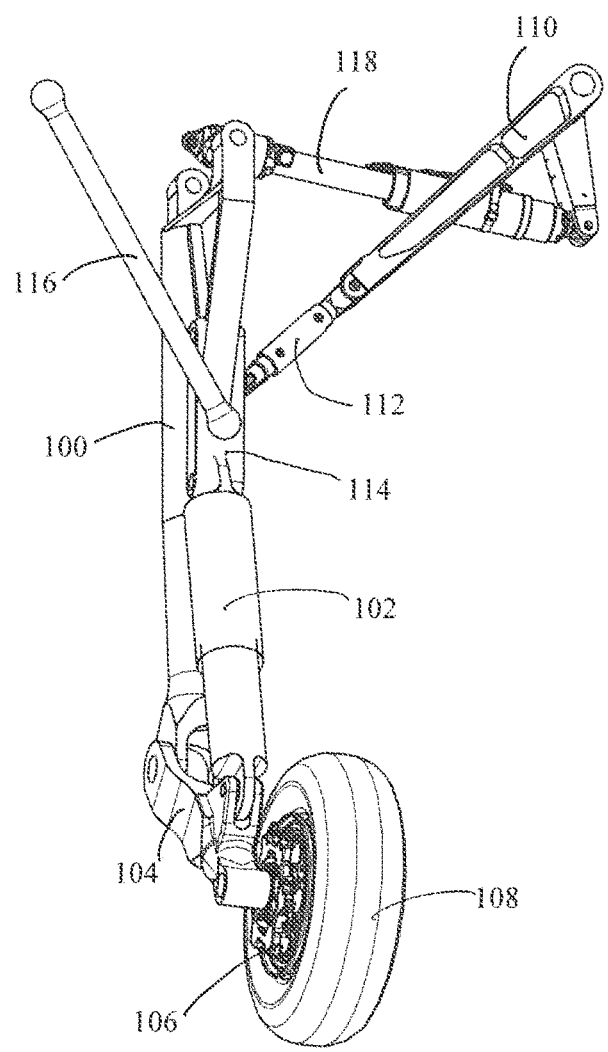
FIG. 7 is a front perspective view of a folding trailing arm landing gear assembly in a deployed position in accordance with the embodiment of the present invention of FIG. 1.

FIG. 7 is a front perspective view of a folding trailing arm landing gear assembly in a deployed position in accordance with the embodiment of the present invention of FIG. 1.

Shown is the main fitting 100, the shock 102, the swing arm 104, the brake assembly 106, the wheel-tire assembly 108, the upper side brace 110, the lower side brace 112, the bellcrank 114, the drivelink 116, the retract servo 118, and the lock solenoid 150.

In operation, after the aircraft is airborne, pressure is applied to the brake assembly 106 to bring the wheel-tire assembly 108 to rest. Next, the lock solenoid 150 (or bellcrank 114 solenoid lock 152 (described below)) is commanded to open by energizing the lock solenoid 150. The lock solenoid 150 serves as a fail-safe to prevent movement of the bellcrank 114 while the landing gear is deployed.

Figure 8:
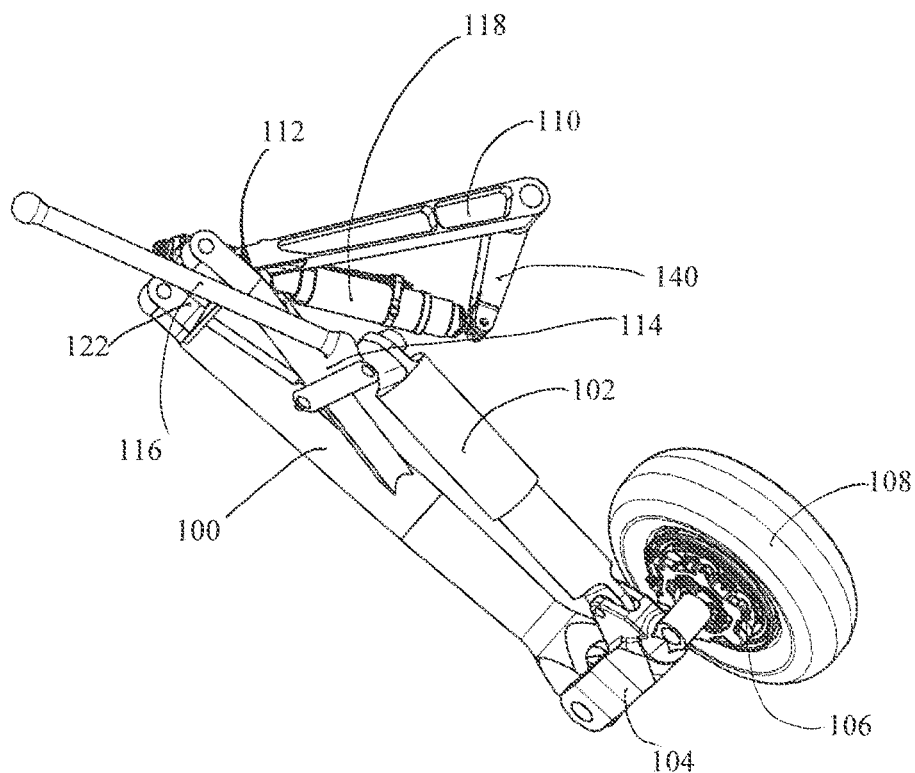
FIG. 8 is a front perspective view of a folding trailing arm landing gear assembly in an intermediate position in accordance with the embodiment of the present invention of FIG. 1.

FIG. 8 is a front perspective view of a folding trailing arm landing gear assembly in an intermediate position in accordance with the embodiment of the present invention of FIG. 1.

Shown is the main fitting 100, the shock 102, the swing arm 104, the brake assembly 106, the wheel-tire assembly 108, the upper side brace 110, the lower side brace 112, the bellcrank 114, the drivelink 116, the retract servo 118, and the lock solenoid 150.

The retract servo 118 is energized and contracts to retract the landing gear into a well or compartment in the wing. To retract the landing gear, the distal end of the crank arm 140 of the crank mechanism 138 rotates toward the main fitting 100. This rotation causes the distal end of the upper side arm to rotate toward the main fitting 100. In response, the lower side arm pulls the main fitting 100 toward the crank mechanism 138 and wing. As the main fitting 100 rotates toward the crank mechanism 138, the drive link pulls the bellcrank 114 away from the main fitting 100. The bell crank pulls up on the shock 102, which pulls up on the swing arm 104, and wheel-tire assembly 108, moving the wheel-tire assembly 108 toward the hinge 122.

Figure 9:
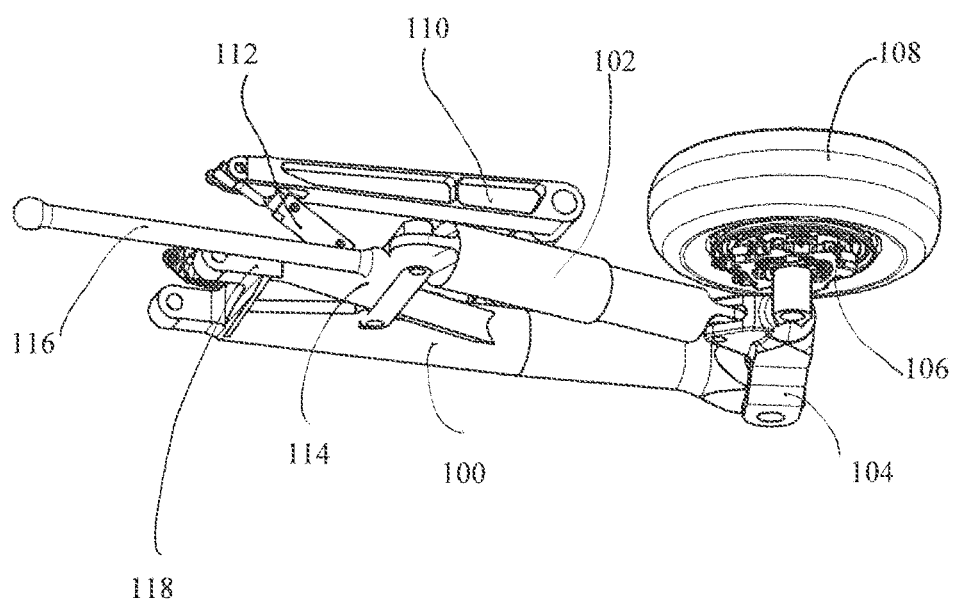
FIG. 9 is a front perspective view of a folding trailing arm landing gear assembly in a folded position in accordance with the embodiment of the present invention of FIG. 1.

FIG. 9 is a front perspective view of a folding trailing arm landing gear assembly in a folded position in accordance with the embodiment of the present invention of FIG. 1.

Shown is the main fitting 100, the shock 102, the swing arm 104, the brake assembly 106, the wheel-tire assembly 108, the upper side brace 110, the lower side brace 112, the bellcrank 114, the drivelink 116, the retract servo 118, and the lock solenoid 150.

As the retract servo 118 continues to pull the crank arm 140 toward the main fitting 100, the upper side arm finally assumes an orientation roughly parallel to the main fitting 100, and thereby pulls the landing gear into its retracted position, such as in the well, or the compartment.

Figure 10:
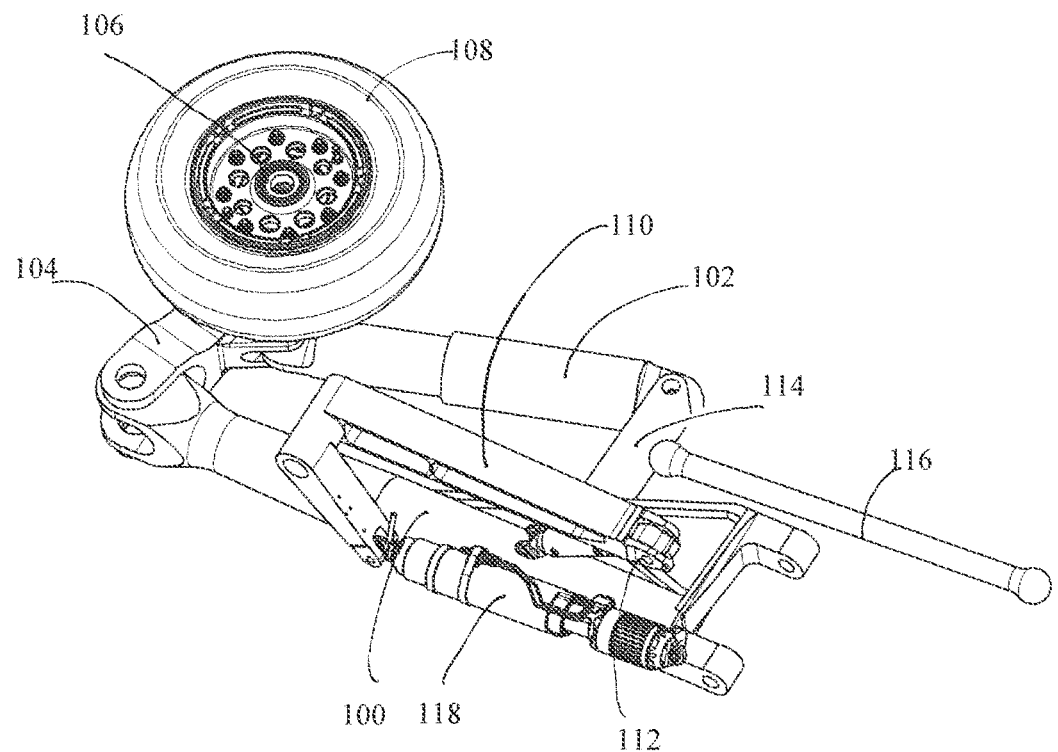
FIG. 10 is a top perspective view of a folding trailing arm landing gear assembly in a folded position in accordance with the embodiment of the present invention of FIG. 1.

FIG. 10 is a top perspective view of a folding trailing arm landing gear assembly in a folded position in accordance with the embodiment of the present invention of FIG. 1.

Shown is the main fitting 100, the shock 102, the swing arm 104, the brake assembly 106, the wheel-tire assembly 108, the upper side brace 110, the lower side brace 112, the bellcrank 114, the drivelink 116, the retract servo 118, and the lock solenoid 150.

Figure 11:
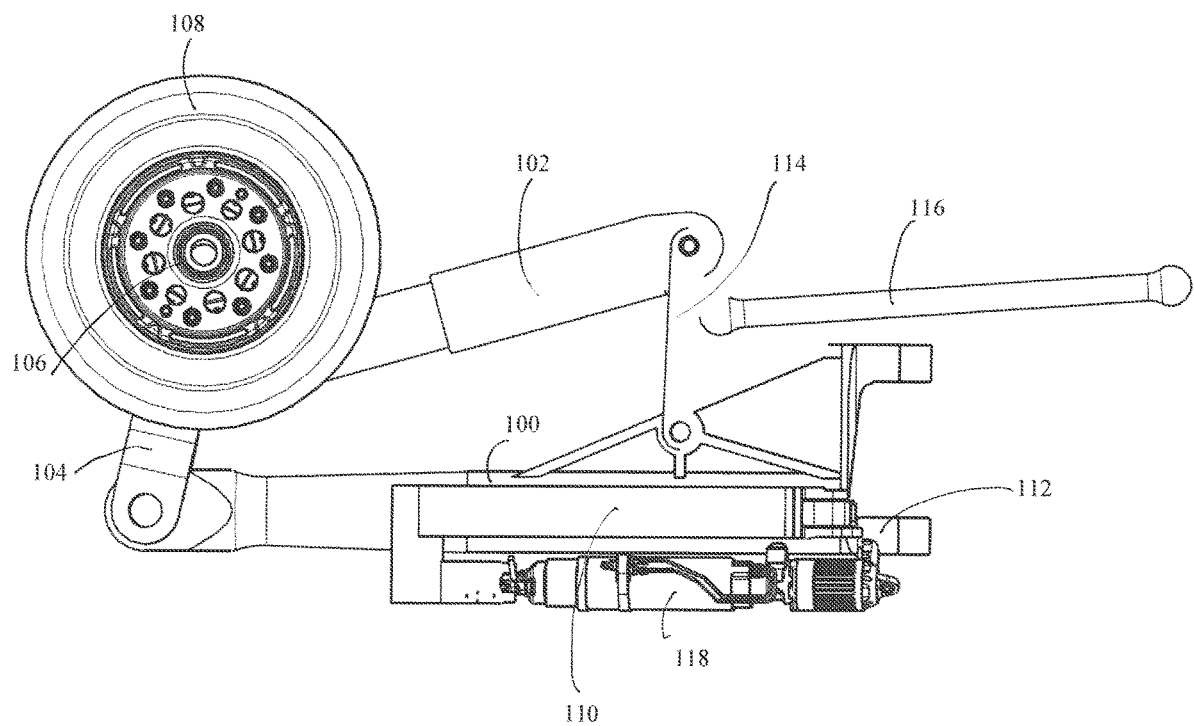
FIG. 11 is a top view of a folding trailing arm landing gear assembly in a folded position in accordance with the embodiment of the present invention of FIG. 1.

FIG. 11 is a top view of a folding trailing arm landing gear assembly in a folded position in accordance with the embodiment of the present invention of FIG. 1.

Shown is the main fitting 100, the shock 102, the swing arm 104, the brake assembly 106, the wheel-tire assembly 108, the upper side brace 110, the lower side brace 112, the bellcrank 114, the drivelink 116, the retract servo 118, and the lock solenoid 150.

Figure 12:
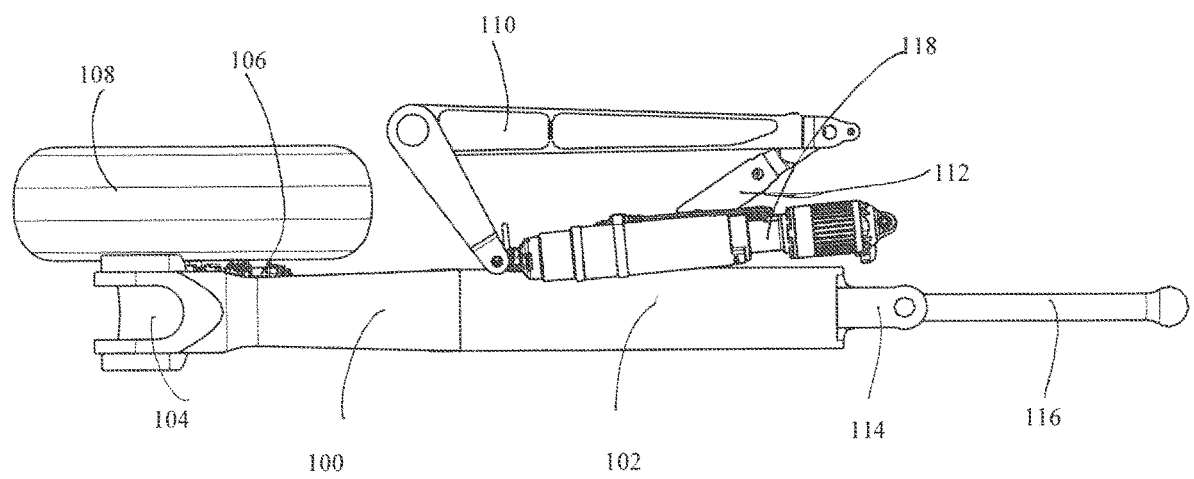
FIG. 12 is a side view of a folding trailing arm landing gear assembly in a folded position in accordance with the embodiment of the present invention of FIG. 1.

FIG. 12 is a side view of a folding trailing arm landing gear assembly in a folded position in accordance with the embodiment of the present invention of FIG. 1.

Shown is the main fitting 100, the shock 102, the swing arm 104, the brake assembly 106, the wheel-tire assembly 108, the upper side brace 110, the lower side brace 112, the bellcrank 114, the drivelink 116, the retract servo 118, and the lock solenoid 150.

Figure 13:
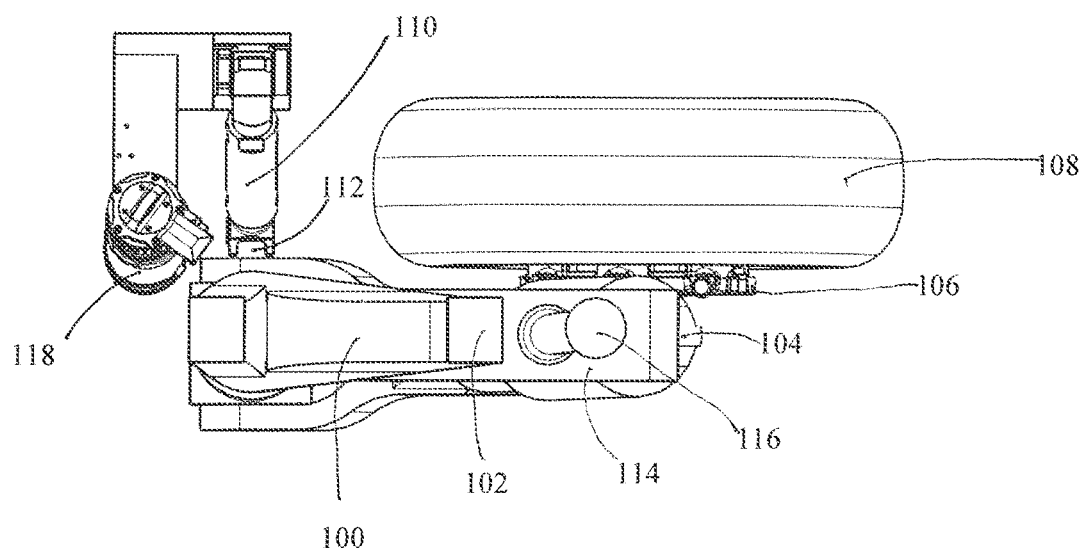
FIG. 13 is an end view of a folding trailing arm landing gear assembly in a folded position in accordance with the embodiment of the present invention of FIG. 1.

FIG. 13 is an end view of a folding trailing arm landing gear assembly in a folded position in accordance with the embodiment of the present invention of FIG. 1.

Shown is the main fitting 100, the shock 102, the swing arm 104, the brake assembly 106, the wheel-tire assembly 108, the upper side brace 110, the lower side brace 112, the bellcrank 114, the drivelink 116, the retract servo 118, and the lock solenoid 150.

Figure 14:
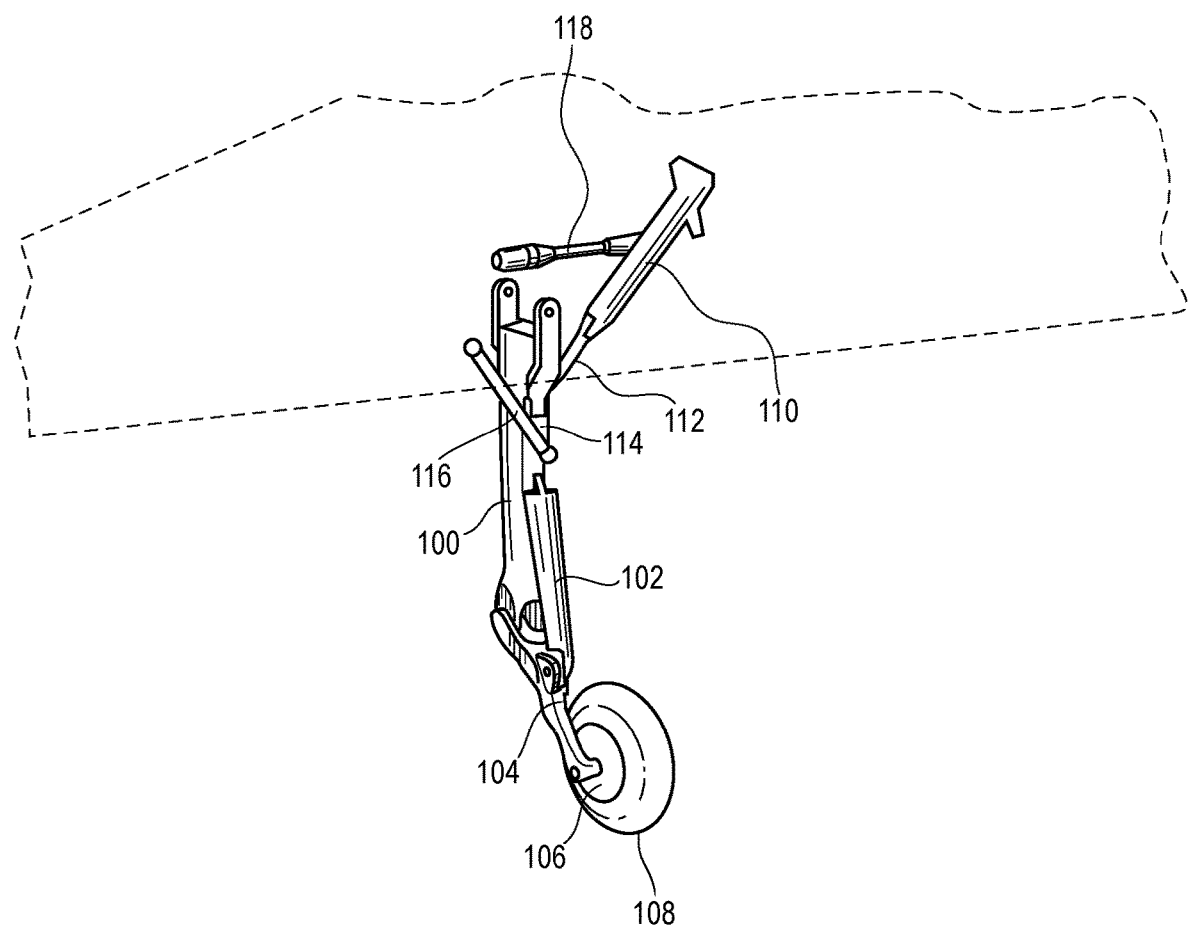
FIG. 14 is a front perspective view of a folding trailing arm landing gear assembly in a deployed position shown in combination with an aircraft wing in accordance with the embodiment of the present invention of FIG. 1.

FIG. 14 is a front perspective view of a folding trailing arm landing gear assembly in a deployed position shown in combination with an aircraft wing in accordance with the embodiment of the present invention of FIG. 1.

Shown is the main fitting 100, the shock 102, the swing arm 104, the brake assembly 106, the wheel-tire assembly 108, the upper side brace 110, the lower side brace 112, the bellcrank 114, the drivelink 116, the retract servo 118, and the lock solenoid 150. Also shown is the aircraft wing.

While the invention herein disclosed has been described by means of specific embodiments, examples and applications thereof, numerous modifications and variations could be made thereto by those skilled in the art without departing from the scope of the invention set forth in the claims.

What is claimed is:

1. A folding trailing arm landing gear assembly comprising:
 a main fitting configured to couple to a hinge positioned at a proximal end;
 a swing arm rotatably coupled at a proximal end to a distal end of the main fitting;
 a shock coupled at a distal end to a distal end of the swing arm;
 a bellcrank coupled at a distal end to a proximal end of the shock, and coupled at a proximal end to the main fitting;
 a wheel coupled to the swing arm;
 a drivelink coupled at a distal end to the bellcrank and configured to couple to a wing at a proximal end, the drivelink being configured in an orientation off-parallel from the main fitting, and off-normal from the main fitting; and a lock solenoid coupled to the main fitting and configured to lock the bellcrank into a deployed position when locked, and configured to release the bellcrank when unlocked.

2. The folding trailing arm landing gear assembly of claim 1 further comprising:

an actuator coupled to the main fitting and configured to pull the main fitting in a direction away from the drivelink, wherein the drivelink pulls the bellcrank when the actuator pulls the main fitting.

3. The folding trailing arm landing gear assembly of claim 2 further comprising:

a crank mechanism interposed between the actuator and the main fitting.

4. The folding trailing arm landing gear assembly of claim 3 further comprising:

a lower side brace interposed between the actuator and the crank mechanism, wherein the lower side brace is rotatably coupled to the main fitting and is rotatably coupled to the crank mechanism.

5. The folding trailing arm landing gear assembly of claim 4 wherein said folding trailing arm landing gear is configured to assume a first configuration in the deployed position and configured to assume a second configuration in a retracted position, wherein said first configuration includes locking the bellcrank in a deployed position, and wherein said second configuration includes pulling the bellcrank into retracted position by pulling the bellcrank with the drivelink wherein the bellcrank pulls the shock wherein the shock pulls the swing arm whereby the overall distance between the hinge and the wheel-tire assembly is reduced.

6. The folding trailing arm landing gear assembly of claim 1 wherein a distal end of the drivelink is coupled to the bellcrank via a spherical bearing.

7. The folding trailing arm landing gear assembly is claim 6 wherein a proximal end of the drivelink includes another spherical bearing.

* * * * *

UNITED STATES PATENT AND TRADEMARK OFFICE
CERTIFICATE OF CORRECTION

PATENT NO. : 10,967,959 B2  
APPLICATION NO. : 15/703416  
DATED : April 6, 2021  
INVENTOR(S) : Allwein et al.

Page 1 of 1

It is certified that error appears in the above-identified patent and that said Letters Patent is hereby corrected as shown below:

In the Claims
Claim 4, Column 9, Line 17, delete "actuator" and insert --main fitting--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*